(12) United States Patent
Li et al.

(10) Patent No.: US 7,058,222 B2
(45) Date of Patent: Jun. 6, 2006

(54) AUTOMATIC BACKGROUND DETECTION OF SCANNED DOCUMENTS

(75) Inventors: Xing Li, Webster, NY (US); Ramesh Nagarajan, Pittsford, NY (US); Mihai Cuciurean-zapan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 775 days.

(21) Appl. No.: 10/173,462

(22) Filed: Jun. 14, 2002

(65) Prior Publication Data

US 2003/0118232 A1    Jun. 26, 2003

Related U.S. Application Data

(60) Provisional application No. 60/341,280, filed on Dec. 20, 2001.

(51) Int. Cl.
*G06K 9/00*    (2006.01)
*G06K 15/00*    (2006.01)

(52) U.S. Cl. ..................... 382/170; 358/3.26
(58) Field of Classification Search ............. 382/170; 358/3.26

See application file for complete search history.

(56) References Cited

U.S. PATENT DOCUMENTS

| | | | | |
|---|---|---|---|---|
| 5,053,808 A | * | 10/1991 | Takagi | 355/38 |
| 5,075,788 A | * | 12/1991 | Funada | 358/2.1 |
| 5,086,485 A | | 2/1992 | Lin | 382/51 |
| 5,115,478 A | * | 5/1992 | Sugiura | 382/175 |
| 5,325,210 A | * | 6/1994 | Takashima et al. | 358/461 |
| 5,696,595 A | * | 12/1997 | Yamanishi | 358/3.23 |
| 5,751,848 A | | 5/1998 | Farrell | 382/172 |
| 5,835,628 A | | 11/1998 | Farrell | 382/168 |
| 5,848,183 A | | 12/1998 | Farrell | 382/172 |
| 5,881,166 A | | 3/1999 | Farrell | 382/168 |
| 6,028,958 A | * | 2/2000 | Kanamori | 382/171 |
| 6,043,900 A | * | 3/2000 | Feng et al. | 358/1.9 |
| 6,618,171 B1 | * | 9/2003 | Tse et al. | 358/446 |
| 6,621,595 B1 | * | 9/2003 | Fan et al. | 358/3.26 |
| 6,674,899 B1 | * | 1/2004 | Nagarajan et al. | 382/168 |

* cited by examiner

*Primary Examiner*—Wenpeng Chen
(74) *Attorney, Agent, or Firm*—William Eipert

(57) ABSTRACT

A background detection process that analyzes background information for the purpose of limiting the impact of intensity information obtained from non-document areas includes: identifying a first white peak from pixels within a first document region; identifying a second white peak from pixels within a second document region; determining if the first white peak was identified using image data from outside of the input document; and if so, identifying a third white peak from pixels within the first document region based on the second white peak.

12 Claims, 2 Drawing Sheets

AUTOMATIC BACKGROUND DETECTION OF SCANNED DOCUMENTS

This application is based on a Provisional Patent Application No. 60/341,280, filed Dec. 20, 2001.

CROSS REFERENCE

Cross reference is made to the following related United States Patent Application: "Automatic Background Detection Of Scanned Documents" by R. Nagarajan, X. Li and F. Tse, U.S. Pat. No. 6,674,899 B2. The above patent and the subject matter of the current application were commonly owned at the time of invention of the subject mailer of the present application and currently are commonly owned.

BACKGROUND

The present disclosure relates to automatic background detection of a scanned document. More particularly, there is disclosed a process for identifying a background value of a scanned document that automatically discriminates signals associated with non-document areas from those of the document.

In many document processing devices, including scanners, facsimile machines, digital copiers, etc., a document or image is scanned using a device which converts the light reflected from the document into electrical charges representing the light intensity from predetermined areas (e.g., pixels) of the document. This image data, which can be in the form of digital or analog signals can be made available to an image processing system wherein the data can be further processed or modified in accordance with specific device. For example, the system may process the signals to enable transmission to a remote device for storage or reproduction, display on a CRT or similar device, reproduction by a digital copier, etc.

When processing scanned image data, it is often desirable to know the contrast of the image being scanned prior to subsequent image processing because, with this knowledge, the image processing system can process the image data so that the reproduced image has the proper contrast. Background detection processes provide one way of obtaining this contrast information. Conventional automatic background detection processes collect information relating to intensity of the scanned image and use this intensity information to determine an intensity level associated with the document background. This intensity level associated with the document background is often referred to as the "background level."

It should be appreciated that determination of the background level of a scanned document is only as accurate as the intensity information from which it is generated. Therefore, when collecting intensity information to determine the background level of a scanned document, it is desirable to include intensity information corresponding to areas from within the document and exclude information collected form areas outside the document. Many existing methods for background detection are performed by sampling intensity information from either a sub-region of the document (typically the leading edge) or across the whole document (page). To avoid the processing and/or hardware overhead or the operator intervention associated with an a-priori determination of document size, shape and location, many of these approaches rely on a predefined measure of scanned image size, shape and location.

While these conventional approaches produce reasonable results when the predefined area accurately reflects the size, shape and location of the scanned document, the approaches may fail to accurately measure the background if the scanned document is not the same size as the predefined measure or if the scanned document is positioned such that predefined measure includes background areas other than that of the document (e.g., platen cover). For example, consider scanning a document from a platen with a white or light gray platen cover. When the document to be scanned is smaller than the predefined measure, the intensity information collected would contain intensity values corresponding to the white platen cover in addition to the intensity values of the document. If enough of the platen cover is included in the information, the background value detected would be incorrect. Therefore, it is desirable to utilize a background detection process that can discriminate intensity information obtained from non-document areas from the intensity information corresponding to the document's background when determining background levels for a scanned document. With such a process, the background value will reflect the value of the document and not the level of non document areas.

SUMMARY

In accordance with the teachings herein, one of the features of the embodiments disclosed herein is a background detection process that analyzes intensity information obtained from multiple regions across a default document area for the purpose of limiting the impact of intensity information obtained from non-document areas when determining a background level for a scanned document.

In accordance with the teachings herein, one of the features of the embodiments disclosed herein is a method for generating a background peak for a scanned document including generating a first histogram from pixels within a first document area, the first document region representing a full page; generating a second histogram from pixels within a second document region; identifying a first white peak from the first histogram; identifying a second white peak from the second histogram; comparing the first white peak to at least one of a minimum threshold, a maximum threshold, and a threshold generated as a function of the second white peak; and identifying a third white peak from within a range of the first histogram defined by a function of the first white peak and by a function of the second white peak.

In accordance with the teachings herein, one of the features of the embodiments disclosed herein is a method of generating a background statistics for a scanned input document, comprising the steps of: determining a first background statistic from pixels within a first document region; determining a second background statistic from pixels within a second document region; determining if the first background statistic includes image data from outside of the input document; and if so, determining a third background statistic from pixels within the first document region as a function of the second background statistic.

DETAILED DESCRIPTION

Figure 1:
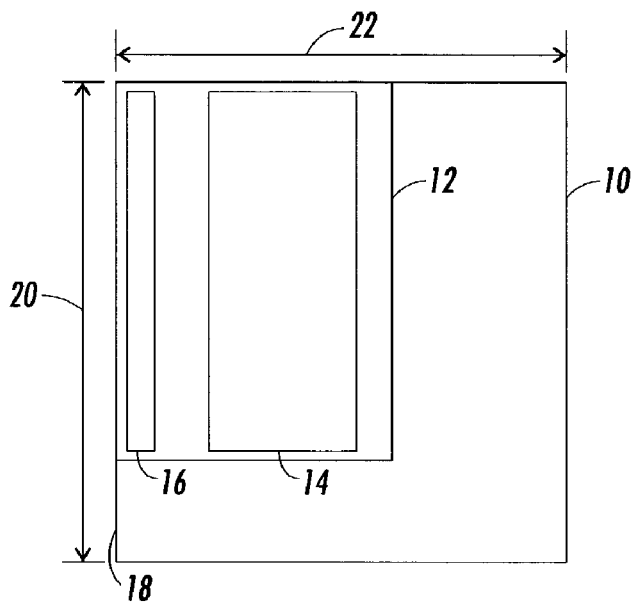
FIG. 1 illustrates the orientation of a scanned document area and regions within the document area used in discussing various features of the embodiments disclosed herein.

In the following detailed description reference is made to image data having a gray value in a range between 0 and 255, wherein a gray level of 0 represents black and a gray level of 255 represents white. However it should be appreciated that any range of gray levels may be used and is not limited to the range of 0 to 255. Additionally, it should be appreciated that the values can be "reversed" such that 0 corresponds to white and 255 corresponds to black. Furthermore, although the following description will refer to image data and "gray level" in the context of a black and white scanning system, it should be readily appreciated that the teachings herein can be used in color applications wherein the image data is collected for one or more colors.

Conventional approaches for determining the background value of a document or image begin by scanning some or all of the document with a scanner to obtain image data signals representing the light intensity from one or more predetermined areas of the document. From this acquired image data, a set of values or statistics (often a histogram) is calculated from which the background value will be determined. When using histogram data, these approaches locate a peak (often referred to white-point, white-peak, or background peak) and use this peak to determine white threshold. The white-peak is the gray level with greatest number of pixels having an intensity related to the background (e.g., white) value of the document or image being scanned.

One common method of locating a white-peak proceeds as follows. After compiling the histogram data, the bin values, each of which is associated with a particular gray level value (e.g., the bin values may range from 0 to 255 for an eight bit system), are read beginning at, for example, the high intensity (white) bins and moving towards to the low intensity (black) bins. The number of entries at each bin (the frequency) is compared to a running stored maximum to find the first peak. To prevent mis-identification of a minor peak in the histogram as the white-peak, the frequency of the gray level bin and/or the gray level of the peak may be compared to a threshold. Furthermore, once a peak has been found in the histogram, the search of the histogram data may continue to look for an adjacent larger peak. If a larger peak is found without encountering a valley, the larger peak may be designated as the white-peak.

Having identified the white-peak, various methods exist in the prior art to determine a value for the gain factor and background level. For example, the background level could be the detected white-peak minus a certain offset. That is, having identified the white-peak, the standard deviation from the mean or the peak in the histogram distribution is determined. In one method, the approximate shape of the histogram is estimated by defining a curve through at least three points including the frequency value in the bin with the highest occurrence frequency and the frequency values in the bins on each side of the bin having the highest occurrence frequency. The standard deviation of the distribution curve of the histogram can then be determined in a known manner. Alternatively, instead of fitting three or more sampled points into curve and approximating the result to a normal distribution, a weighted average of the sampled points can be used to determine the mean. Having the computed mean can and assuming a normal distribution, the standard deviation can be obtained in a conventional manner.

Alternatively, as a typical histogram distribution closely resembles a normal Gaussian distribution, the determination of the quarter (¼) peak value represents a reasonable estimate of the two sigma points from the mean (peak) in the histogram. In other words, the gray level having a frequency less than or equal to ¼ the peak frequency represents a point that is 2 standard deviations away from the mean or peak point in the histogram distribution. Alternatively, If the quarter (¼) peak frequency location cannot be determined, the gray level value which has a peak frequency equal to ⅝ of the peak frequency of the white-peak can be used as identifying a gray level which is one standard deviation away from the mean or peak value of the histogram to comprise the background level.

A more complete discussion of generating and utilizing histogram data and determining background levels can be found in the following commonly owned US patents, which are incorporated by reference herein for their teachings: U.S. Pat. No. 5,086,485 entitled "Method and Apparatus for Dynamically Setting a Background Level" to Lin; U.S. Pat. No. 5,751,848 entitled "System and Method for Generating and Utilizing Histogram Data from a Scanned Image" to Farrell; U.S. Pat. No. 5,835,628 entitled "Method and System for Generating Histograms from a Scanned Image" to Farrell; U.S. Pat. No. 5,848,183 entitled "System and Method for Generating and Utilizing Histogram Data from a Scanned Image" to Farrell; U.S. Pat. No. 5,881,166 entitled "Method and System for Generating A Histogram of a Scanned Image" to Farrell; U.S. Pat. No. 6,198,845 entitled "Method for Determining Document Background for Adjusting the Dynamic Range of an Image of the Document" to Tse, et al; and U.S. patent application Ser. No. 09/918,014 entitled "Adaptive Autobackground Suppression to Compensate for Integrating Cavity Effect" to Nagarajan, et al.

Turning now to FIG. 1, there is shown a diagram illustrating the orientation of a scanned document area and regions within the scanned document area used in discussing the embodiments disclosed herein. In FIG. 1, area 10 represents a platen on which a document to be scanned is placed. Area 12 within the platen represents a predefined area corresponding to a default size and shape of a standard full page document (e.g., 8.5×11, A4, etc.) from which data may be collected when scanning an input document. FIG. 1 further shows two regions 14 and 16 within default area 12. The size, shape and location of region 14 is selected such that it provides a representative sample of the image data from across the default document area 12.

The size, shape and location of region 16 is selected such that, if an input document that is smaller in size than the default area 12 is placed on the platen, it is expected that data collected from the region would include data signals corresponding to the document. For example, region 16 is shown comprising several scanlines collected from near the lead edge of area 12. Since an operator usually places an input document at the top left corner (registration corner) of a platen when doing scanning, the image data from region 16 should most likely be collected from the input document rather than from the platen cover It should be noted that the regions 14 and 16 are shown for illustration purposes and are not limited to the regions shown in FIG. 1. Any one or more of the size, shape, position and orientation of the regions can be modified for a given application. That is, a region may be extended or contracted in one or both of the fastscan and slowscan directions. Furthermore, a region may be any shape and is not limited to the rectangular shape illustrated. Additionally, it should be appreciated that one or both of the regions 14 and 16 may comprise two or more sub-regions. For example, image data representing a full page across the default area 12 may be collected using a region 14 comprising four sub-regions each of which is located near a corner (or along an edge) of area 12. Furthermore, it should be appreciated that the regions 14 and 16 need not be mutually exclusive.

It should also be appreciated that while the embodiments are discussed herein with respect to a platen in which the upper left hand corner defines the registration corner, the disclosed embodiments can be easily adapted for scanning with other registration positions.

Figure 2:
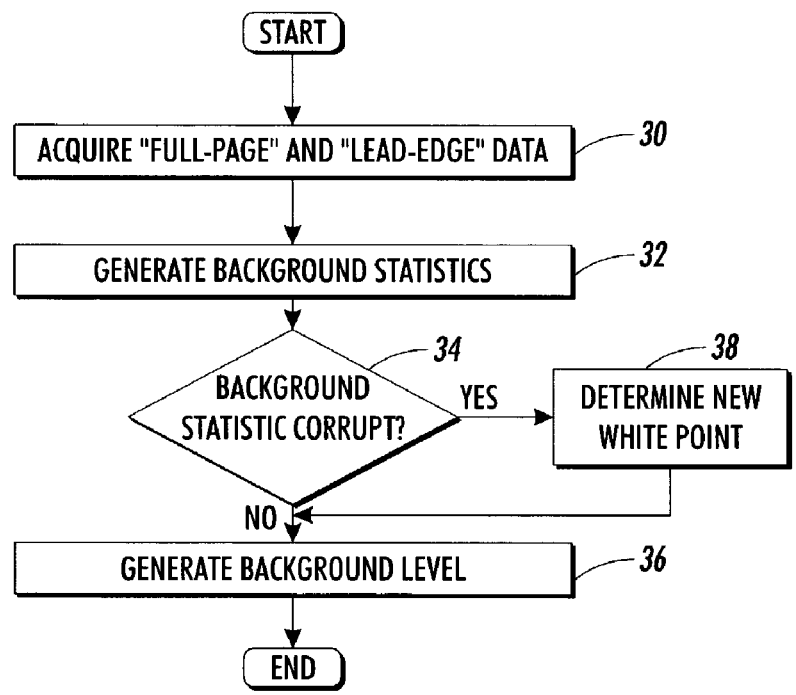
FIG. 2 is a flowchart illustrating embodiments of a process for identifying a background value of a scanned document that automatically discriminates signals associated with of non-document areas from those of the document.

Turning now to FIG. 2, there is shown flowchart illustrating embodiments of a process for identifying a background value of an input document that discriminates signals associated with the input document from those associated with areas outside the input document (i.e., non-document areas).

At step 30, the process acquires image data from regions 14 and 16. It should be appreciated that in collecting data from regions 14 and 16, the operation may sample and obtain image data from every predefined scanning location (pixel), or the operation may use a sub-set (sub-sample) of the image data from within the region. For purposes of discussion, the data collected from region 14, and any subsequent values generated therefrom, will be referred to as the "full-page" data as the region is selected to provide a desired representative sample from across the default area 12. Similarly, the data collected from region 16, and any subsequent values generated therefrom, will be referred to as "lead-edge" data as the region illustrated as located near the lead edge for purposes of this discussion. However, as discussed above, although region 14 may comprise the entire document area, it need not. Similarly, although region 16 is shown in FIG. 1 as being located near lead edge 18, as previously discussed, the region is not limited to such size, shape or location.

Continuing at step 32, one or more background statistics are generated for each of the regions 14 and 16 using the image data collected at step 30. That is, one or more lead-edge background statistics such as a histogram, a white-peak, peak standard deviation, gain factor, background gray level, etc. are generated using the lead-edge data corresponding to region 16 collected at step 30. Similarly, one or more full-page background statistics such as a histogram, a white-peak, peak standard deviation, gain factor, background gray level, etc. are generated using the full-page data collected at step 30.

In one embodiment, step 32 identifies a lead-edge white-peak and a full-page white-peak using the lead-edge data and the full-page data, respectively. The identification of a white-peak can be performed using any available technique. For example, a histogram can be generated from the image data collected at step 30. Having generated the histogram, a search for the first peak in the histogram is conducted starting from the bin number corresponding to high intensity (white), e.g., 255, and moving towards to the low intensity bins. Among other conditions, the pixel count for a bin has to be greater than a certain pre-defined threshold in order for that bin to qualify as a peak. Additionally, there should be a lower range beyond which the search for a white-peak will not proceed. These conditions can be represented by the following C++ like statement, with "histo" being a histogram object:

WhitePeak=histo.WhitePeak (Lower_Bin_Limit, Upper_Bin_Limit, Count_Min); wherein Upper_Bin_Limit specifies the starting point of the histogram detection and the Lower_Bin_Limit is a pre-defined parameter identifying the lower bin at which, if a peak has not been detected, the search will stop. Count_Min is a pre-defined parameter identifying the minimum number of pixels required to qualify as a peak.

At step 34, one or more of the full-page background statistics generated at step 32 are analyzed to determine if the full-page background statistic(s) may be corrupt. That is, an analysis is performed to determine if a full-page background statistic can be considered to be derived from or include image data from outside the input document. Any number of tests on a variety of background statistics can be used to determine whether a given background statistic may be corrupt. For example, the step may compare the full-page white-peak to the range corresponding to possible platen cover gray level values (e.g., a range defined by the highest and lowest gray level values expected for the platen cover). Another option for the step is to analyze the full-page white-peak to determine if it is greater than the lead-edge white-peak detected by a certain margin. A similar option is to determine if the absolute difference between the lead-edge and full-page peaks is less than a threshold margin. A further option is to determine if the full-page white-peak is narrow by some measurement (e.g., it's width at half height is smaller than a pre-defined threshold). A similar option is to determine if the standard deviation of the full-page white-peak is similar to the standard deviation the average gray level of the platen cover. Mathematically these comparisons can given as:

$$\text{Platen\_Video\_Min} < \text{full-white-peak} < \text{Platen\_Video\_Max} \quad (1)$$

$$(\text{lead-white-peak} + \text{Lead\_Platen\_Margin}) < \text{full-white-peak} \quad (2)$$

$$|\text{lead-white-peak} - \text{full-white-peak}| > \text{Max\_Peak\_Diff} \quad (3)$$

$$\text{Width}(\text{full-white-peak}) < \text{Width\_Thresh} \quad (4)$$

$$\text{fp-wp-std-dev} < \text{Platen\_Max\_Std\_Dev} \quad (5)$$

wherein full-white-peak and lead-white-peak identify the gray level value for the peaks identified in the full-page and lead-edge data; Platen_Video_Min is the lowest gray level value for the platen cover; Platen_Video_Max is the highest gray level value for the platen cover; Lead_Platen_Margin is the maximum offset distance from the lead-edge white peak; Max_Peak_Diff is the maximum allowable difference between the peaks; Width_Thresh is the minimum width threshold and Platen_Max_Std_Dev is the maximum standard deviation of the average gray level of the platen cover; and fp-wp-std-dev is the standard deviation of the full-page white peak. Although the values discussed above refer to gray levels, it is equally applicable to refer the corresponding bin number. The values for parameters Platen_Video_Min, Platen_Video_Max, Width_Thresh and Platen_Max_Std_Dev can be determined through calibration techniques.

If any of the conditions shown in equations (1)–(5) is met, it is evidence that the full-page white peak (and the full-page data) may be corrupted by data collected from outside the input document range. The analysis can rely on any one or combination of the options discussed above. In selecting one or more of the analysis options discussed above, consideration may be given to the desired performance and robustness of the process. Furthermore, the analysis can use one or more of the above in a hierarchical or weighted manner. Additionally, the selection of the options for analysis may be made dynamically. For example, the analysis may only use comparisons to the lead-edge peak if the lead-edge satisfies certain conditions. Furthermore, the analysis need not be limited to the background statistics discussed above. For example, the analysis may use the determined background level rather than the white peak.

If it is determined that one or more background statistics such as the full-page white peak does not include data (is not derived from) image data from outside the input document boundaries, then at step 36 the process determines a background level for the input document based upon the full-page data. For example, the background level to be suppressed could be the detected white peak minus a certain offset, the value of which can be determined by a separate algorithm. If the background level for the input document based upon the full-page data had been generated in step 32, then this previously determined background level is used and the step 36 may be skipped. On the other hand, if the result of the analysis of step 34 is that the full-page data may contain image data collected from areas outside the input document, the process continues at step 38.

Continuing with step 38, a search for a new white peak is conducted. In one embodiment the search is conducted using the full-page data collected at step 30; however, the search could be conducted using data from a third region. In searching for a new white peak, one or more constraints may be placed on the search to assist in the detection of a valid new peak. A valid new peak is a white peak which meets all the constraints set out for detection. For example, one constraint may be to limit the search to a range of bins numbers identified by a lower bin number and/or an upper bin number. One option for setting a lower bin limit is to link the lower bin to that of the lead-edge white peak such as by setting the lower limit to be equal to or be some offset from lead-edge white peak. Similarly, an option for setting the upper bin number is to tie this limit to the current (i.e., corrupted) full-page white peak location such as by having the upper limit be equal to or some offset from the full-page white peak. Another constraint may be to require that the new peak satisfy a certain pixel count condition. For example, when searching for a new peak, the pixel count threshold might be linked to the pixel count of the first full-page peak detected. Additionally, any of the conditions described above with respect to step 34 may be used as constraint(s) for the new peak; particularly if the search for the peak uses a different set of data than was used to determine the full-page peak.

If a valid new peak is detected, then it will replace the first one (e.g., the full-page peak) to indicate the white point the scanned input document. On the other hand, if a valid new peak is not identified, then the full page white peak can be replaced with an alternate new peak such as a default value or a white peak generated from image data collected from a smaller region such as the lead-edge white peak. Having replaced the full-page white peak with a new white peak, the process continues at step 36 wherein a background level is generated using the new white peak. Here again, if the background level has been previously generated, the step can be skipped. Otherwise, as described above, a background level to be suppressed is generated using the new white peak.

Figure 3:
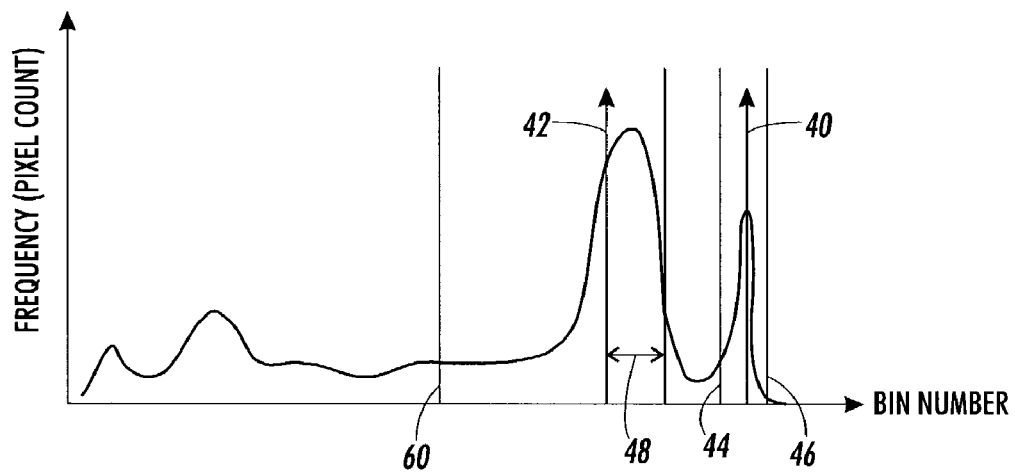
FIGS. 3 and 4 show a sample histogram identifying several pre-defined and dynamically generated variables useful in describing one or more of the disclosed embodiments.
Figure 4:
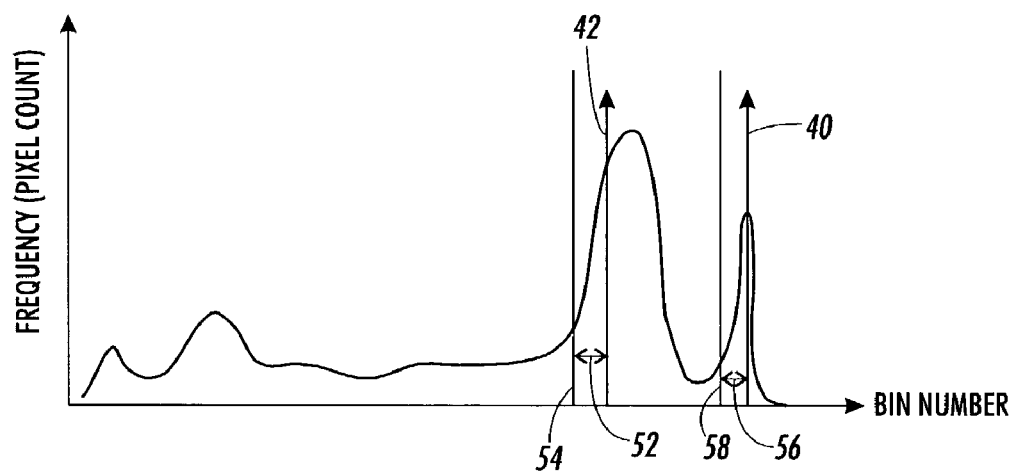

To further illustrate features of the embodiments disclosed above, an example of an embodiment in accordance with the above disclosure will be provided. In discussing the example, additional reference can be made to FIGS. 3 and 4 wherein there are show a sample histogram illustrating several of pre-defined and dynamically generated variables identified above. A specific example of a process which illustrates features of the embodiments disclosed in above can be illustrated by the following C++ like code:

```
fullWhitePeak = histo.WhitePeak (Full_Lower_Bin_Limit,
    Full_Upper_Bin_Limit, Full_Count_Min);
leadWhitePeak = histo.WhitePeak (Lead_Lower_Bin_Limit,
    Lead_Upper_Bin_Limit, Lead_Count_Min);
minPeakVal = Factor*fullWhitePeak.count;
if (fullWhitePeak > leadWhitePeak + Lead_Platen_Margin
    && fullWhitePeak >= Platen_Video_Min
    && fullWhitePeak <= Platen_Video_Max
    && histo.PeakWidth (fullWhitePeak, Height) < Width_Thresh)
{
    newWhitePeak = histo.WhitePeak (leadWhitePeak – Lead_Offset,
    fullWhitePeak – Platen_Offset, minPeakVal);
}
```

In the above pseudo code, fullWhitePeak (40) and leadWhitePeak (42) identify the gray level value for the peaks found in the full-page and lead-edge data, respectively; Platen_Video_Min (44) is the lowest gray level value for the platen cover; Platen_Video_Max (46) is the highest gray level value for the platen cover; Lead_Platen_Margin (48) is a maximum offset distance form the lead-edge white peak; Width_Thresh is a minimum width threshold for a peak; Lead_Offset (52) is an offset from lead-edge white peak to set a lower bin limit (54) in a new peak search; Platen_Offset (56) is a offset from the full-page white peak for setting a Full_Upper_Bin_Limit (58) in a new peak search; Full_Lower_Bin_Limit (60) and Lead_Lower_Bin_Limit identify the lower bin at which, if a peak has not been detected, the search stops; Full_Count_Min and Lead_Count_Min identify the minimum number of pixels required to qualify as a peak; and Factor is a weighting factor linking minimum pixel count required for a new peak to the number of pixels in first full-page peak detected. The values for the parameters Platen_Video_Min, Platen_Video_ Max, Width_Thresh, Platen_Offset, Full-Upper_Bin_ Limit, Full_Lower_Bin_Limit, Full_Count_Min, Lead_Upper_Bin_Limit, Lead_Lower_Bin_Limit and Lead_Count_Min can be determined through testing and/or calibration techniques.

In summary, there has been disclosed several embodiments of a process for determining the background peak of a scanned image that discriminates gray level information corresponding to the input document's background from gray level information obtained from outside the input document's boundaries. In one embodiment, the approach collects image data from a region representing the size and shape of a standard full page document and generates a histogram therefrom. The approach also collects image data from a region representing near the lead edge of a standard full page document and generates a histogram therefrom. The approach identifies white peaks from the histograms determines if the peak for the full page area contains image data from outside the boundary of the input document. If so, the approach looks beyond the first peak value of the full page area to determine if a second, valid background peak can be found.

Although the features of the several embodiments have been described in detail above, various modifications can be implemented without imparting from the spirit. Thus, these embodiments are not confined to the details above, but are intended to cover such alternatives, modifications, and variations as may come within the scope of the attached claims.

What is claimed is:

1. A method for generating a background peak for a scanned document, comprising:
   generating a first histogram from pixels within a first document region, the first document region representing a full page;
   generating a second histogram from pixels within a second document region;
   identifying a first white peak from the first histogram;
   identifying a second white peak from the second histogram;
   comparing a width of the first white peak to a width threshold;
   comparing the first white peak to at least one of a minimum threshold, a maximum threshold, and a threshold generated as a function of the second white peak; and
   identifying a third white peak from within a range of the first histogram defined by a function of the first white peak and by a function of the second white peak.

2. The method according to claim 1, wherein:
   the function of the first white peak adds a first offset value to the first peak to set an upper limit; and
   the function of the second white peak adds a second offset value to the second peak to set a lower limit.

3. The method according to claim 2, further comprising determining a background level for the scanned document based on the third white peak.

4. A method of determining a background statistic for a scanned input document, comprising the steps of:
   identifying a first white peak from pixels within a first document region;
   identifying a second white peak from pixels within a second document region;
   determining if the first white peak was identified using image data from outside of the input document; and
   if so, identifying a third white peak from pixels within the first document region based on the second white peak, wherein a lower search limit of a range to search for a peak is set as a sum of an offset margin value and the second white peak.

5. The method according to claim 4, wherein the step of identifying a third white peak further comprises setting the value of the third white peak to equal to a function of the second white peak when a white peak is not detected within a range.

6. The method according to claim 4, further comprising determining a background level for the scanned document based on the third white peak.

7. The method according to claim 4, wherein the step of determining if the first white peak was identified using image data from outside of the input document comprises:
   analyzing the first white peak using at least one of the following comparisons: comparing the first white peak to a minimum threshold; comparing the first white peak to a maximum threshold; comparing the first white peak to a threshold generated as a function of the second white peak; and comparing a width of the first white peak to a width threshold.

8. A method of determining a background statistic for a scanned input document, comprising the steps of:
   identifying a first white peak from pixels within a first document region, the first document region representing a full page;
   identifying a second white peak from pixels within a second document region, the second document region comprising a subset of the first document region;
   determining if the first white peak was identified using image data from outside of the input document; and
   if so, identifying a third white peak from pixels within the first document region, wherein a limit of a range to search for the third peak is set as a sum of an offset margin value and the second white peak.

9. The method according to claim 8, wherein the step of identifying a third white peak further comprises selling the value of the third white peak to equal to a function of the second white peak when a white peak is not detected within the range to search.

10. The method according to claim 9, wherein the second document region corresponds to a document lead edge.

11. The method according to claim 8, further comprising determining a background level for the scanned document based on the third white peak.

12. The method according to claim 8, wherein the step of determining if the first white peak was identified using image data from outside of the input document comprises comparing the first white peak at least one of a minimum threshold; a maximum threshold; a threshold generated as a function of the second white peak; and a peak width threshold.

* * * * *